United States Patent [19]
Ellington

[11] 3,934,666
[45] Jan. 27, 1976

[54] BIKE BOOSTER

[76] Inventor: Robert W. Ellington, 4414 Concho St., Dallas, Tex. 75206

[22] Filed: Jan. 2, 1974

[21] Appl. No.: 429,493

[52] U.S. Cl. .................................. 180/11; 280/204
[51] Int. Cl.² ........................................ B62P 59/04
[58] Field of Search ........ 180/11, 13, 14 B; 280/204

[56] References Cited
UNITED STATES PATENTS

| | | | |
|---|---|---|---|
| 653,415 | 7/1900 | Ford | 280/204 |
| 730,193 | 6/1903 | Parker | 280/204 |
| 1,165,467 | 12/1915 | Tideman | 180/11 |
| 1,341,379 | 5/1920 | Mauclaire | 180/11 |
| 1,407,597 | 2/1922 | Smith | 180/11 |
| 2,517,162 | 8/1950 | Arman | 280/204 X |
| 2,552,846 | 5/1951 | Dinkins | 180/11 |
| 3,271,048 | 9/1966 | Beesley | 280/204 |
| 3,312,299 | 4/1967 | Kuecker | 280/204 X |
| 3,347,559 | 10/1967 | Robinson | 280/204 |

FOREIGN PATENTS OR APPLICATIONS

| | | | |
|---|---|---|---|
| 877,506 | 11/1942 | France | 180/11 |
| 883,787 | 7/1943 | France | 280/204 |
| 869,109 | 1/1942 | France | 180/11 |
| 29,345 | 3/1914 | United Kingdom | 180/11 |
| 629,785 | 4/1936 | Germany | 280/204 |
| 22,157 | 10/1902 | United Kingdom | 280/204 |

Primary Examiner—Leo Friaglia
Assistant Examiner—Terrance L. Siemens

[57] ABSTRACT

This invention combines a power booster unit with ready means of attachment to a bicycle, without altering the bicycle in any way, whereby the booster unit drives independently and to the rear of the bicycle through the booster wheels and may be simply detached.

7 Claims, 2 Drawing Figures

BIKE BOOSTER

BRIEF SUMMARY

Various means have been conceived and tried for propelling a bicycle, without rider effort, to provide a practical, economical, rapid means of transportation. To do this it has been necessary to attach a power unit in various semi or permanent arrangements usually by altering the bicycle and making it unfit for use, without power, by simple pedaling. It follows that any scheme combining a bicycle and power unit should propel the bicycle within prudent speeds relieving the rider of this burden over prolonged distance to effect a faster and more practical means of transportation, but should be removable so that use of the bicycle by normal pedaling is not impaired.

It is the object of this invention to fulfill such requirement by using a rear power booster unit having its own drive wheels so that there is no interference with the wheels or crank mechanism of the bicycle. Also, it is the object of this invention to connect the rear power booster unit to the bicycle by the simplest means so that the unit effectively boosts but does not cause any adverse effect in balance or directional control of the bicycle. Furthur, it is the object of this invention to provide a joint of attachment which allows thrust from the booster unit, or pull from the bicycle, from any rearward direction, without affecting the stability of either bicycle or booster unit.

DETAILED DESCRIPTION

Figure 1:
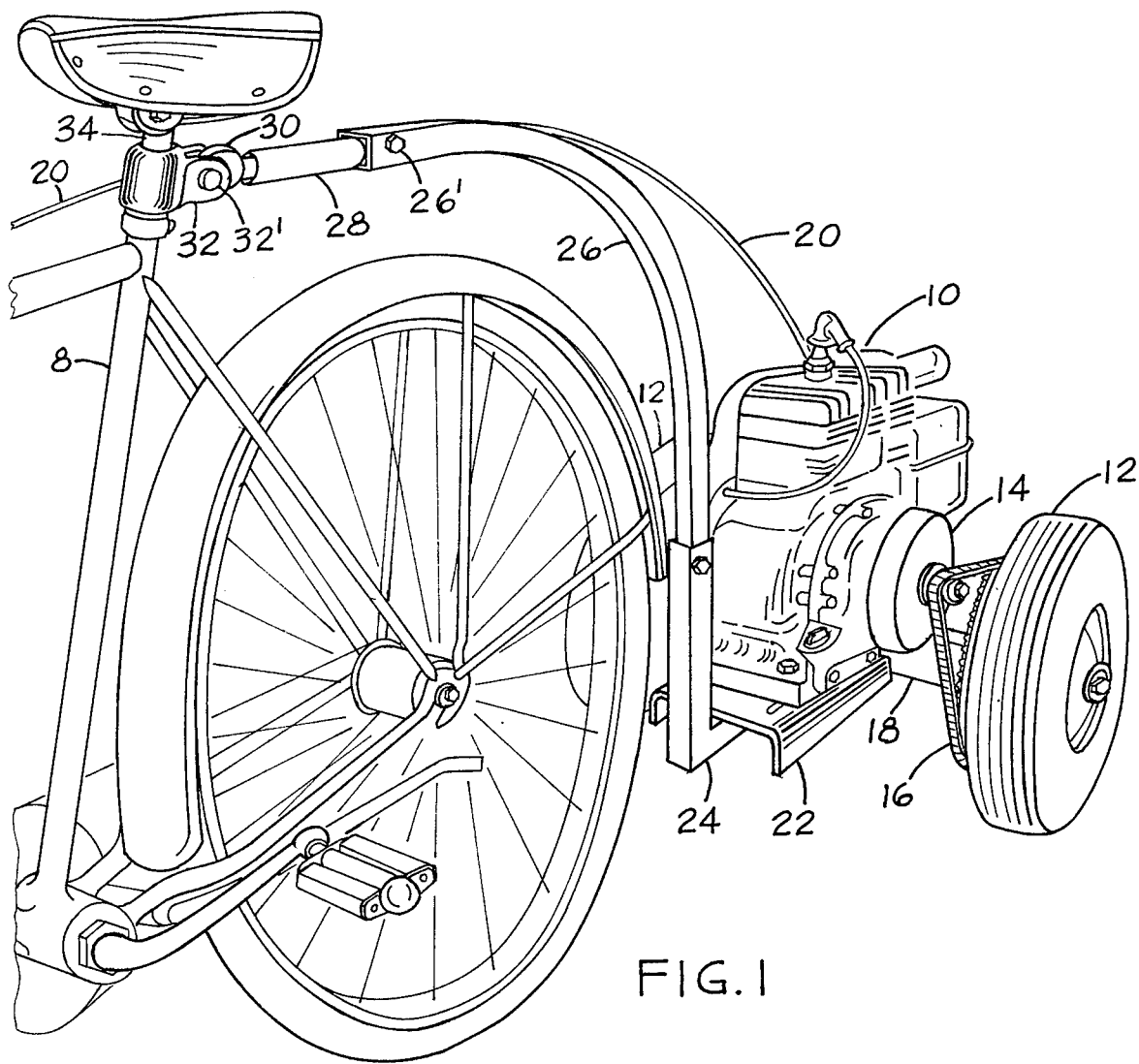
FIG. 1 is a perspective view of the rear portion of a bicycle showing the booster unit in connection with the bicycle.

In view 1, the booster unit is comprised of a prime mover, or motor 10, which applies the motive power to one or both wheels 12 through a clutch 14 and drive chain, or belt, 16 over sprockets, or pulleys, integral with the clutch and wheel, as shown. It will be evident to one versed with such drives that the wheel axle may be either live or fixed. In the case of a fixed axle both wheels rotate independently and the driven wheel propels. A live axle is fixed to both wheels with the drive through one wheel, but both wheels propel and the axle rotates in bearings apart from the wheels, as fixed to axle brace 18. This invention is not limited by either arrangement, but may employ the fixed or live axle for propulsion by one or both wheels.

Clutch 14 is preferably of the centrifugal type for automatic engagement depending on motor speed. The motor speed is controlled by any commercially available twist grip or lever control attached to the bicycle handle bar through throttle control cable 20 to motor 10.

Motor 10 is mounted on a slotted base 22 with attaching bolts through the slots allowing motor movement for take-up adjustment of drive chain 16.

Arm brace 24 is firmly fixed to and extends forward of base 22 and is of substantial section to provide connection between the booster unit and bicycle 8 by arm 26. Arm 26 fits and adjusts vertically of brace 24 for size of bicycle and is fixed by fastner 24'. Arm extension 28 adjusts horizontally with arm 26 for size of bicycle and is fixed by fastner 26'.

Figure 2:
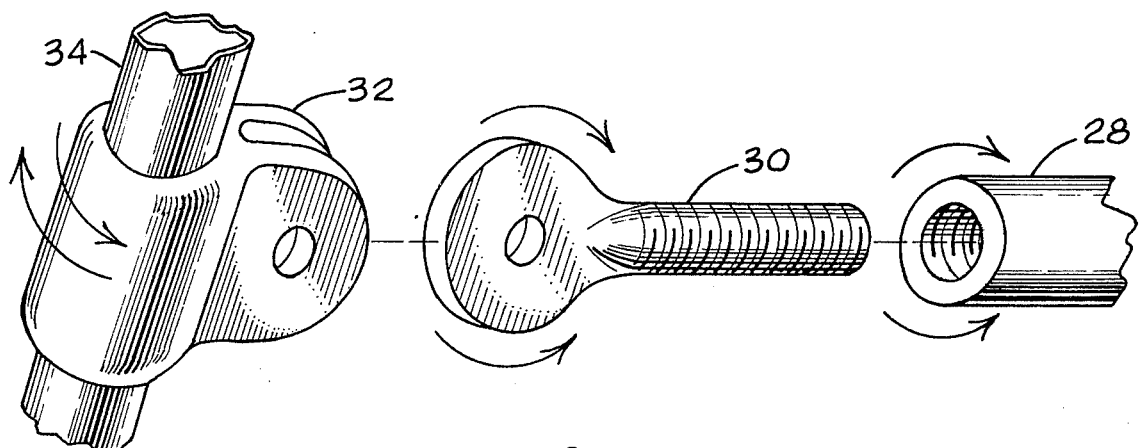
FIG. 2 is an expanded perspective view of the connecting universal joint.

Collar 32 and link 30 acting with arm extension 28 comprise the essential universal joint of attachment between booster unit and bicycle. Collar 32 is positioned around the seat post 34 and is held vertically between frame and seat and swings freely about post 34 indicated indicated by arrows, FIG. 2. Link 30 is attached to collar 32 between the two bosses and is fixed by fastner 32', or preferably by the shackle of a pad lock which makes for security and quick easy assembly. Link 30 is free to rotate about fastener 32', or a lateral axis perpendicular to the seat post, as indicated by arrows, FIG. 2. The shank of link 30 is threaded and screws into the internally threaded end of arm extension 28 allowing arm 26 to rotate about an axis parallel and coincident with the shank of link 30 and arm extension 28. Thus it is evident that the connecting arm of the booster unit can rotate freely relative to the bicycle about the seat post axis and mutual axes allowing unrestricted movement. It is evident that the connecting arm of the booster unit can move in any direction relative to the bicycle without causing adverse reaction and will always direct a forward thrust component by the booster unit.

The invention embraces and defines the action of this universal joint and it can be seen by one versed in such things that some variation exists such as using a commercially available clevis, to replace link 30, connected to one boss on the collar but serving the same function. The double bosses of collar 32 make possible a tighter joint of close clearance while still retaining complete freedom of movement. Any variation such as the clevis is deemed to be within the scope of this invention.

The motor 10, FIG. 1, is drawn to represent a small single cylinder gasoline engine, however, the invention is not so limited and can also embrace an electric motor, with storage batteries stowed in any practical manner on or about the motor base, or any suitable power unit.

I claim:

1. The combination of a bicycle and a rear independent booster unit, with means connecting the booster unit to the bicycle and an attaching joint, wherein the improvements comprise: in the booster unit a single axle brace fixed to a single motor base piece, said base piece providing support and fixity for a double adjustable telescoping connecting means to which an attaching universal joint allows complete unrestricted rotary movement of the booster unit with relation to the bicycle, or of the bicycle with relation to the booster unit, about three mutual closely perpendicular axes.

2. In the booster unit of claim 1, a single base piece consisting of a structural section having slotted adjustment openings through which fasteners secure the prime mover to the single base piece.

3. The base section of claim 2 wherein longitudinal inverted vertical edge stiffeners form a strong rigid structural section.

4. In the booster unit of claim 1, a rigid one piece axle brace fixed transversely to said booster unit base, to which the axle means is closely attached and of sufficient length to support the axle.

5. The connecting means of claim 1 consisting of an arm brace, arm and arm extension, wherein said arm brace fixes to said booster base, said arm telescopes adjustably within and fixes to said arm brace for vertical variation, said arm extension telescopes adjustably within and fixes to said arm for horizontal variation, both adjustments thereby varying for sizes of bicycles.

6. The arm extension of claim 5 wherein the exposed extending forward end is internally threaded to accept the threaded link shank of the universal joint.

7. The universal joint of claim 1 consisting of a collar, with bosses, and a link, whereby said collar is sized to fit and swing around a bicycle seat post, said link being sized to closely fit and easily and quickly detach from the bosses of said collar by a fastener passing through said bosses and link and about which said link is free to rotate, wherein the shank of said link is threaded and provides positive fixity and freedom of rotation for the threaded arm extension of the connecting means.

* * * * *